United States Patent [19]

Daniels

[11] Patent Number: 4,531,169
[45] Date of Patent: Jul. 23, 1985

[54] READ/WRITE HEAD-POSITIONING APPARATUS FOR A MAGNETIC RECORDING DISK DRIVE UNIT

[76] Inventor: Kenneth M. Daniels, 125 Roberta Dr., Woodside, Calif. 94062

[21] Appl. No.: 353,690

[22] Filed: Mar. 1, 1982

[51] Int. Cl.³ ............................................. G11B 5/012
[52] U.S. Cl. ....................................................... 360/98
[58] Field of Search .................................... 360/97–99, 360/104–106, 137, 86

[56] References Cited

U.S. PATENT DOCUMENTS 4,441,130 4/1984 Boehm et al. ........................ 360/97

Primary Examiner—John H. Wolff
Attorney, Agent, or Firm—Hamrick, Hoffman, Guillot & Kazubowski

[57] ABSTRACT

Head positioning apparatus for a magnetic disk drive unit (10) including a disk pack portion (12) and a head-positioning portion (14), the latter employing a linear magnetic induction motor (22) for accurately positioning an associated head (20) relative to the disk pack portion (12) while permitting efficient assembly of the head-positioning portion (14) due to the arrangement of slide bearing shafts (30, 32) on the outside of the motor (22) and the use of an adjustable lever arm (38) and a bracket (48) at respective ends of the slide bearing shafts (30, 32). Fluid bearings are used throughout, with the disk pack portion (12) employing a fluid thrust bearing (88) in a means for coupling a plurality of disks (80) to an associated drive motor (86) in order to isolate the disks (80) from axial fluctuations of the motor armature (90) along its axis of rotation and prevent damage to the disks.

8 Claims, 8 Drawing Figures

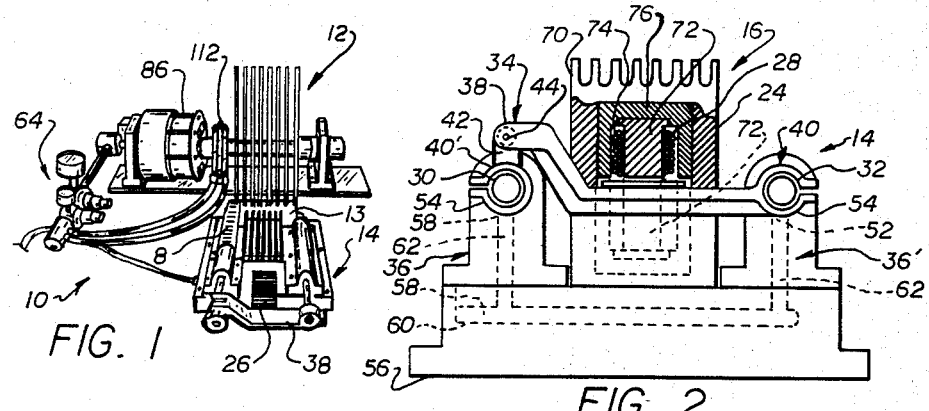
FIG. 1
FIG. 2
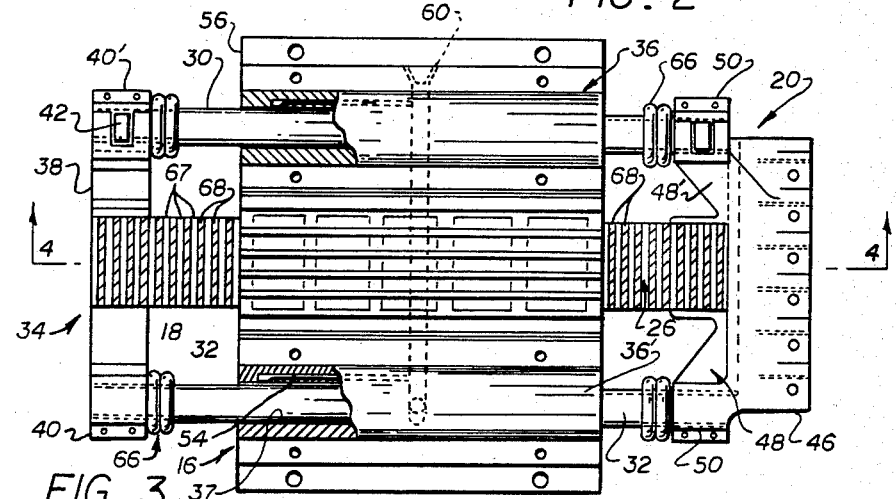
FIG. 3
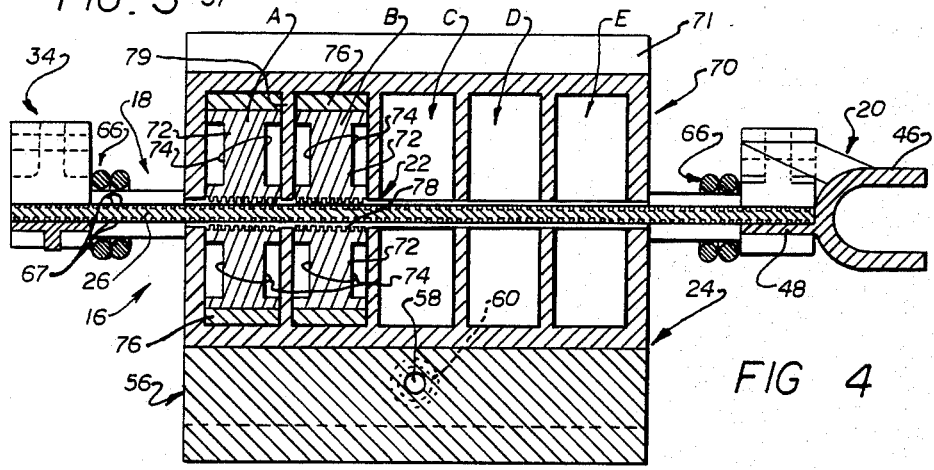
FIG 4

(1) = FULLY ENERGIZED COIL
AT 3.5 AMP/45 VOLT

| DISTANCE | A | B | C | D | E | PHASE |
|---|---|---|---|---|---|---|
| .000 | 1 | 1 | 1 | 0 | 0 | ABC |
| .001 | 4/5 | 1 | 1 | 0 | 0 | |
| .002 | 3/5 | 1 | 1 | 0 | 0 | |
| .003 | 2/5 | 1 | 1 | 0 | 0 | |
| .004 | 1/5 | 1 | 1 | 0 | 0 | |
| .005 | 0 | 1 | 1 | 0 | 0 | BC |
| .006 | 0 | 1 | 1 | 1/5 | 0 | |
| .007 | 0 | 1 | 1 | 2/5 | 0 | |
| .008 | 0 | 1 | 1 | 3/5 | 0 | |
| .009 | 0 | 1 | 1 | 4/5 | 0 | |
| .010 | 0 | 1 | 1 | 1 | 0 | BCD |
| .011 | 0 | 4/5 | 1 | 1 | 0 | |
| .012 | 0 | 3/5 | 1 | 1 | 0 | |
| .013 | 0 | 2/5 | 1 | 1 | 0 | |
| .014 | 0 | 1/5 | 1 | 1 | 0 | |
| .015 | 0 | 0 | 1 | 1 | 0 | CD |
| .016 | 0 | 0 | 1 | 1 | 1/5 | |
| .017 | 0 | 0 | 1 | 1 | 2/5 | |
| .018 | 0 | 0 | 1 | 1 | 3/5 | |
| .019 | 0 | 0 | 1 | 1 | 4/5 | |
| .020 | 0 | 0 | 1 | 1 | 1 | CDE |
| .021 | 0 | 0 | 4/5 | 1 | 1 | |
| .022 | 0 | 0 | 3/5 | 1 | 1 | |
| .023 | 0 | 0 | 2/5 | 1 | 1 | |
| .024 | 0 | 0 | 1/5 | 1 | 1 | |
| .025 | 0 | 0 | 0 | 1 | 1 | DE |
| .026 | 1/5 | 0 | 0 | 1 | 1 | |
| .027 | 2/5 | 0 | 0 | 1 | 1 | |
| .028 | 3/5 | 0 | 0 | 1 | 1 | |
| .029 | 4/5 | 0 | 0 | 1 | 1 | |
| .030 | 1 | 0 | 0 | 1 | 1 | DEA |
| .031 | 1 | 0 | 0 | 4/5 | 1 | |
| .032 | 1 | 0 | 0 | 3/5 | 1 | |
| .033 | 1 | 0 | 0 | 2/5 | 1 | |
| .034 | 1 | 0 | 0 | 1/5 | 1 | |
| .035 | 1 | 0 | 0 | 0 | 1 | EA |
| .036 | 1 | 1/5 | 0 | 0 | 1 | |
| .037 | 1 | 2/5 | 0 | 0 | 1 | |
| .038 | 1 | 3/5 | 0 | 0 | 1 | |
| .039 | 1 | 4/5 | 0 | 0 | 1 | |
| .040 | 1 | 1 | 0 | 0 | 1 | EAB |
| .041 | 1 | 1 | 0 | 0 | 4/5 | |
| .042 | 1 | 1 | 0 | 0 | 3/5 | |
| .043 | 1 | 1 | 0 | 0 | 2/5 | |
| .044 | 1 | 1 | 0 | 0 | 1/5 | |
| .045 | 1 | 1 | 0 | 0 | 0 | AB |
| .046 | 1 | 1 | 1/5 | 0 | 0 | |
| .047 | 1 | 1 | 2/5 | 0 | 0 | |
| .048 | 1 | 1 | 3/5 | 0 | 0 | |
| .049 | 1 | 1 | 4/5 | 0 | 0 | |
| .050 | 1 | 1 | 1 | 0 | 0 | |

MOVE SEQUENCE THRU 1 PITCH

FIG. 5

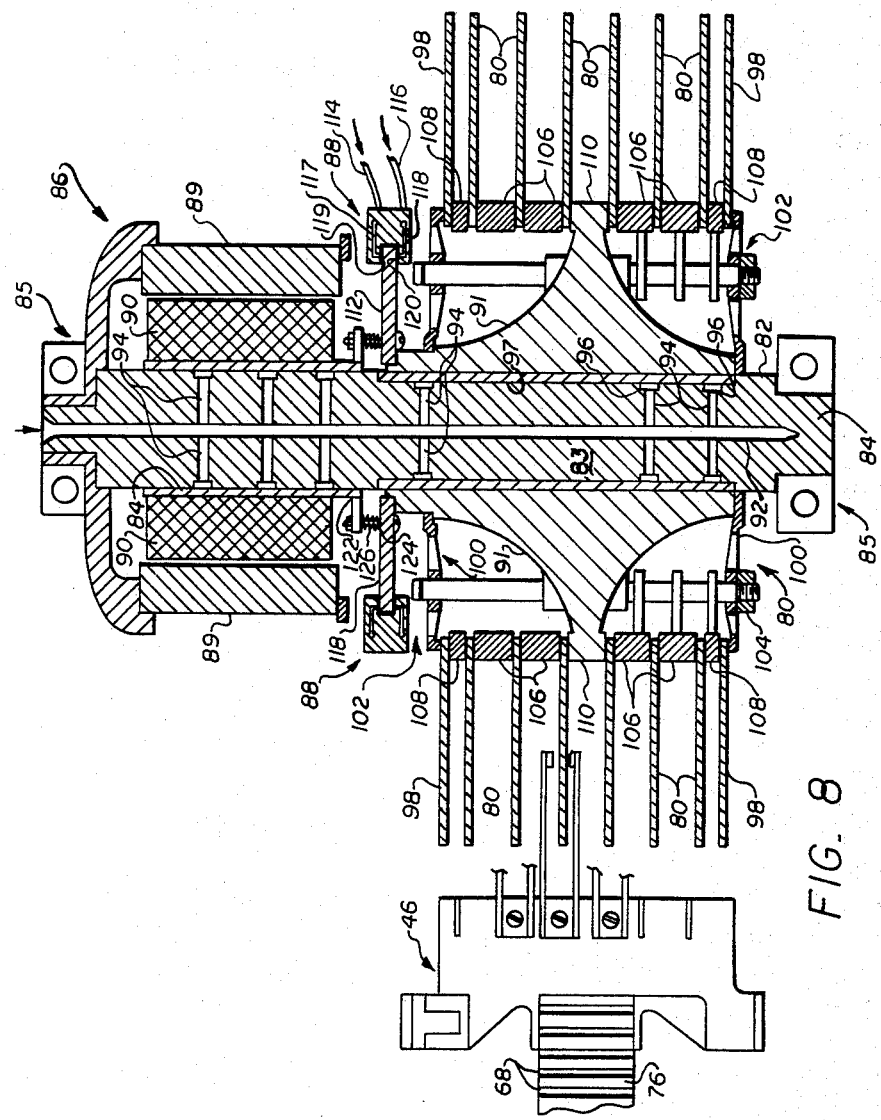

READ/WRITE HEAD-POSITIONING APPARATUS FOR A MAGNETIC RECORDING DISK DRIVE UNIT

BACKGROUND OF THE INVENTION

1. Field of the Invention

This invention relates generally to disk recorders, and more particularly to disk drive and read/write head-positioning apparatus in a magnetic disk recording machine.

2. Description of the Prior Art

Information storage in computers and similar devices is commonly performed by a magnetic disk recording unit wherein a plurality of stacked disks are rotated relative to a read/write head radially displaceable relative to the disk for selectively positioning the heads to a radial portion of the disk where information storage or retrieval is desired. It is important, however, that the recording heads ride on a film of air between the head and adjacent surface of an associated magnetic disk, since actual contact between the head and disk surface will severely damage the disk. So sensitive is the disk employed in such devices that there are recording units in actual use that are run continuously in order to avoid "freezing" of a recording head to a surface of a magnetic disk which the head contacts while the disk is stationary and resulting shattering of the heads when it is again set in motion.

U.S. Pat. No. 3,586,891, issued June 22, 1971, to R. A. Applequist, et al., discloses a magnetic recording disk drive wherein a linear positioning motor converts an electrical address signal directly into linear motion in order to position associated recording heads. A rack and pawl mechanism locks the recording heads at predetermined locations over the recording surfaces of associated recording disk, while a stationary cam cooperates with a loading ramp provided on an access arm of the head for directly loading and unloading the head as the access arm is moved radially of the magnetic disk. Such an approach tends to be relatively slow in reacting to instructions to change position because of the numerous mechanisms which must function at each movement of the head and due to the use of a carriage external of the linear motor for positioning the heads.

My prior U.S. Pat. No. 4,166,284, issued Aug. 28, 1979, discloses a read/write head-positioning apparatus for positioning one or more heads in a disk recorder and including a magnetic stator assembly having a co-axially, longitudinally-extending, annular coil-receiving cavity and a pair of longitudinally-extending, air bearing forming, passageways provided therein. An armature assembly including a pair of main bearing shafts is disposed to pass through the passageways and a member affixed to the shaft ends for carrying a cylindrical coil support adapted to carry a drive coil within the coil-receiving cavity and for receiving the head-carrying arms. A pump is coupled to the stator assembly to create an air bearing flow in the passageways around the main bearing shafts so the electro-magnetic interaction between the drive coil and the magnetic stator assembly can be used to position the recording heads with a minimum of frictional resistance. This arrangement, however, while very precise and fast-acting has encountered problems in manufacture due to the close control of tolerances required during assembly of the bearing shaft of the armature assembly into the armature itself and into the stator assembly.

SUMMARY OF THE PRESENT INVENTION

It is an object of the present invention to provide a precise and fast-acting read/write head-positioning apparatus which eliminates the need for control of head carriage alignment tolerances during assembly of the apparatus.

It is another object of the present invention to provide a magnetic recording unit suitable for use in computers, and the like, in which both the read/write head-positioning apparatus and associated disk drive apparatus employ extremely low friction bearings without the need for close control of head carriage alignment tolerances during assembly of the apparatus.

Briefly, these and other objects are achieved according to the present invention by providing a magnetic disk drive unit comprising magnetic disk pack means in which a stack of disks are attached to an associated drive motor by a resilient connection and held against actual movement by a fluid bearing arrangement. A magnetic head-positioning assembly associated with the disk pack assembly employs a linear magnetic induction motor having a substantially planar armature disposed between a pair of fluid slide bearings which slideably support the armature. A self-adjusting mounting arrangement associated with the slide bearings, and including pillow blocks mounted on a suitable support, permits assembly of the armature of the linear motor of the invention without the need for close control of tolerances with regard to the slide bearings.

An advantage of the present invention is that assembly is possible without need to control tolerances of the component parts of the head carriage assembly.

Another advantage of the invention is that both a read/write head-positioning unit and an associated magnetic disk drive unit float on fluid bearings, thus eliminating possible damage to the magnetic disk of the arrangement.

Yet another advantage of the present invention is that the use of fluid bearings throughout permits fast reaction of the read/write positioning portion of the recording unit.

These and other objects and advantages of the present invention will not doubt become apparent to those of ordinary skill in the art after having read the following detailed description of the preferred embodiments which are illustrated in the several figures of the drawing.

IN THE DRAWINGS

FIG. 1 is a perspective view showing a magnetic disk drive unit according to the present invention;

FIG. 2 is a front elevational view, partly broken away and in section, showing the head-positioning portion of the unit seen in FIG. 1, the disk pack portion of the unit being eliminated for clarity;

FIG. 3 is a top plan view of the head-positioning portion of the invention as seen in FIG. 2;

FIG. 4 is an exploded sectional view taken generally along the line 4—4 of FIG. 3;

FIG. 5 is a chart illustrating a sequence of energization of a linear magnetic induction motor according to the present invention;

FIG. 8 is a partially schematic, longitudinal sectional view showing the disk pack portion of the magnetic disk drive unit illustrated in FIG. 1.

DESCRIPTION OF THE PREFERRED EMBODIMENTS

Figure 6:
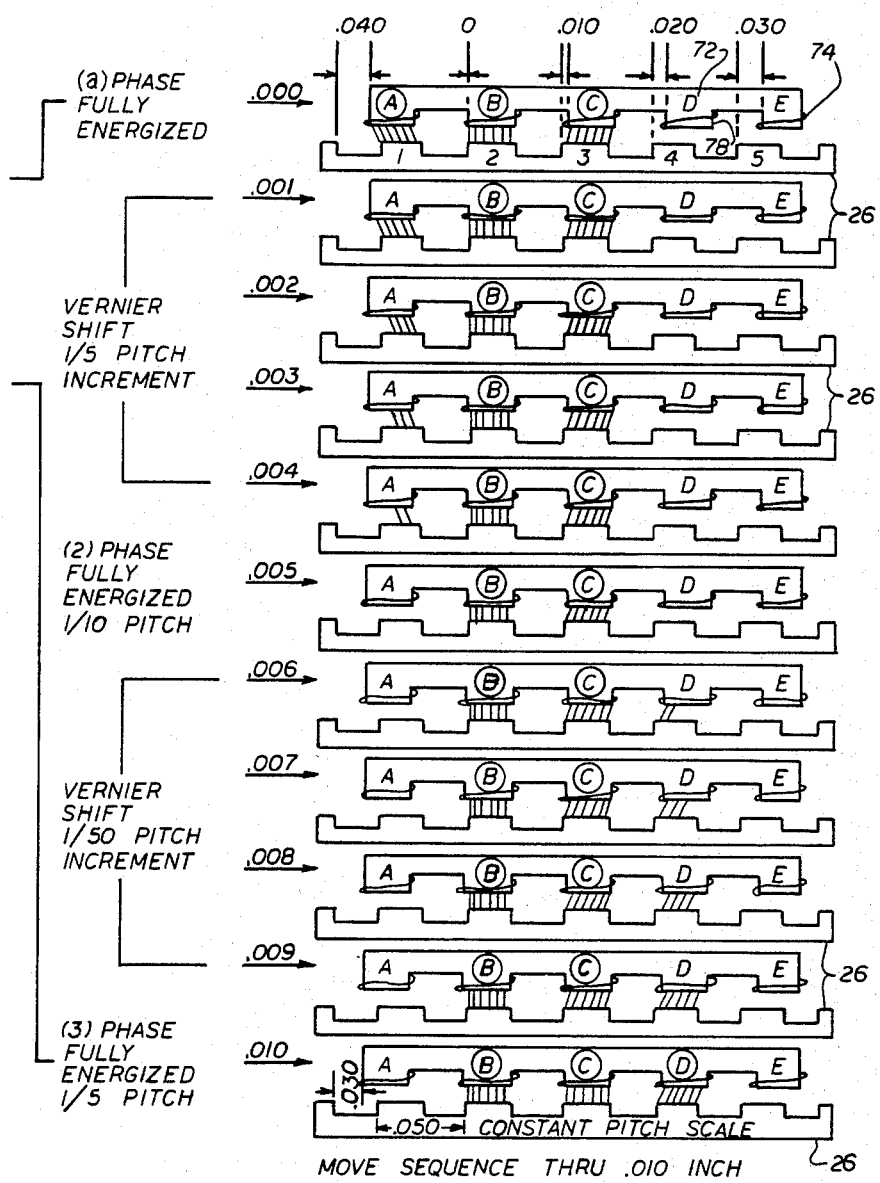
FIG. 6 is a schematic representation of the manner in which a linear magnetic induction motor according to the present invention is cycled in accordance with the chart of FIG. 5.

Referring now more particularly to FIG. 1 of the drawings, a magnetic disk drive unit 10 according to the present invention is illustrated as comprising a magnetic disk pack portion 12 and a magnetic head-positioning portion 14 which is arranged for magnetically interacting with the disk pack portion 12. Associated with portion 14 and mounted so as to travel with a head 13 being positioned is a generally longitudinally extending indicator member P having detectable indicia which is graduated in a suitable manner to cooperate with a sensor (not shown) in order to give indication of the position of the associated read/write head. One such member is illustrated and described in my above-identified U.S. Pat. No. 4,166,284. Since such head carried arrangements are conventional and commonly employed in magnetic disk recording units, member P will not be further illustrated or described hereafter.

DESCRIPTION OF FIGS. 2–4

Referring now to FIGS. 2 through 4 of the drawings, head-positioning portion 14 includes a stator assembly 16 associated with which is an armature assembly 18 arranged for movement relative to stator assembly 16. A head attachment assembly 20 is mounted on armature assembly 18 for movement threwith relative to recording disks of disk pack portion 12 (FIG. 1). As can be seen from the drawings, stator assembly 16 and armature assembly 18 cooperate to form a linear induction motor 22 wherein the stator assembly 16 includes a block 24 through which is slideably mounted a longitudinal armature element 26 partially forming armature assembly 18 and arranged for sliding longitudinally relative to the block 24. Disposed within block 24 above and below the opening receiving longitudinal armature element 26 is an electro-magnetic arrangement 28 to be described in greater detail below and which acts in a cooperative manner for moving longitudinal element 26 relative to block 24 of stator assembly 16 in a manner to be described in detail below with reference to FIGS. 5 and 6 of the drawings.

Armature assembly 18 is transported by a carriage framework including a pair of slide bearing shafts 30 and 32 arranged substantially parallel to one another and extending co-extensively or respective sides of and longitudinally with element 26. A pair of self-adjusting mounting brackets 34 and 48 are affixed to the respective ends of bearing shafts 30 and 32 for facilitating alignment of the latter in a manner which will now be described.

A pair of pillow blocks 36 and 36' having longitudinally extendng bases 37 (FIG. 3) are mounted to a base 56 and are arranged for slideably receiving respective bearing shafts 30 and 32. Bracket 34 includes a transversely extending arm 38 affixed to one end of bearing shaft 32 as by the illustrated clamp 40. A clamp 40' similar to clamp 40 but provided with an upstanding crank 42 is likewise affixed to a corresponding end of bearing shaft 30, with the free end of arm 38, the end spaced from clamp 40, being pivotally attached to crank 42 as by the illustrated pin 44. As can be appreciated, appropriate positioning of clamp 40' on its associated bearing 30, so as to properly position crank 42 with respect to lever arm 38, permits assembly of mounting arrangement 34 in a simple manner without regard to alignment tolerances of bearing shafts 30 and 32 relative to their associated pillow blocks 36 and 36'.

Head assembly 20 includes a generally U-shaped element 46 of conventional construction as commonly employed to support a plurality of read/write magnetic recording heads (not shown). This element 46 is an extension of a bracket 48 terminating in transverse portions in clamps 50 and 50' which mount element 46 on associated ends of bearing shafts 30 and 32 in a manner similar to the mounting of lever arm 38. Hence, like lever arm 38, bracket 48 can be mounted on bearing shafts 30, 32 in a simple manner without regard to alignment tolerances in the positioning of shafts 30, 32 in their associated pillow blocks 36 and 36'.

The bottom portions of pillow blocks 36, 36' are preferably provided with air holes 52 (FIG. 2), advantageously having associated therewith longitudinally extending grooves 54, in order to permit injection of a suitable fluid, such as air, between pillow blocks 36, 36' and the associated bearing shafts 30, 32. A preferable means of implementing the provision of air or other fluid supply to the clearance space between shafts 30, 32 and the internal surfaces of the shaft receiving bases 37 is disclosed on my prior U.S. Pat. No. 4,166,284, and said disclosure is incorporated herein by reference. A base plate 56 on which pillow blocks 36 and 36' are mounted has provided therein a passage 58 extending from a suitable fitting 60 and connected to air holes 52, as by risers 62. Fitting 60 is connected to a suitable air supply 64 of a conventional nature and illustrated generally in FIG. 1.

Bumpers 66 in the form of annular rings constructed from a resilient material, such as rubber, are preferably disposed on bearing shafts 30 and 32 adjacent the longitudinal ends thereof so as to abut the respective clamps 40, 40' and 50, 50= and cushion the end travel of armature assembly 18 relative to stator assembly 16.

Longitudinal armature member 26 preferably is constructed from cold rolled steel, or the like, and has formed therein on both top and bottom a plurality of transverse, parallel slots which define transverse ridges 67 forming magnetic return path bars as will be explained below. The slots 65 can receive a plurality of bars 68 constructed from copper, or the like, in order to function as shorting legs to facilitate demagnetization. Alternatively, member 26 could be copper plated and remachined to remove the plating from the ridges 67 and leave the shorting legs within the transverse grooves. The use of copper bars 68 eliminates any currents formed during cycles between the ridge bars 67, and improves response of linear motor 22.

Although the size and spacing of the ridge bars 67 on the faces of member 26 can vary, a width of 0.050 inch, ie, the spacing between bars 68, has been found satisfactory, and as bars 68 are formed by pieces of copper, or the like, and inserted into grooves provided in the faces of member 26, a width and depth of 0.050 inch for such grooves has been found satisfactory.

Block 24 comprises a hollow metal housing 70 having fins 71 formed in an upper surface thereof to function as a heat sink, and having arranged in the hollow interior thereof a plurality of spool-shaped cores 72 and 72'

(FIG. 4) of rectangular section and arranged in opposed banks. The pole faces of each core 72, 72' are also provided with transverse slots to form ridges 78 of width and spacing corresponding to the ridge bars 67 of armature 18. Each core 72, 72' has provided thereon an electrical winding 74 in order to form electromagnets. While any suitable material can be employed to construct cores 72, 72', "ARMCO" magnetic iron has been found satisfactory. U-shaped inserts 76 (See also FIG. 2) are provided in the chambers formed within hollow box 70 to receive cores 72, 72' and to form opposite magnetic poles corresponding to an associated core 72, 72'.

Magnetic flux will travel from the respective wound core 72, 72' through the ridges of armature member 26 to the corresponding outer poles 77 of an associated insert 76, or in the reverse direction depending on the orientation of the winding 74 disposed on the particular core 72, 72'. All pairs of opposed cores 72, 72' must be wound in the same direction so as to exert offsetting forces on member 26.

A plurality of copper bars similar to bars 68 may also be provided in the slots formed on the surfaces of cores 72, 72' adjacent an associated one of the faces of longitudinal member 26.

Walls 79 (FIG. 4) separate cores 72, 72' from one another along the line of pairs of cores 72, 72' extending from bracket 34 toward bracket 48. These walls 79 are dimensioned so as to create an "offset" along the line of magnets and are to cause progressive misalignment of the core ridge faces relative to the armature ridge bar faces down-the-line of magnets. For example, if each wall 79 is 0.110 inch thick, an offset of 0.010 inch will be obtained along each successive chamber A–E containing a core 72, 72' from bracket 34 toward bracket 48 when spacing between bars 68 of member 26 is the aforementioned 0.050 inch. This offset will have the effect of allowing selective magnetic drive of member 26 as same is moved longitudinally relative to cores 72, 72' and inserts 76, in a manner to be described below.

DESCRIPTION OF FIGS. 5 AND 6

Referring now more particularly to FIGS. 5 and 6 of the drawings, it will be seen that the precise control possible by use of a linear motor 22 as described above permits precise selective positioning of head assembly 20 with very short response times.

FIG. 5 is a chart setting forth an example of proportions of full power which may be applied to windings 74 of the electromagnets A–E at the given distances starting from, for example, the end of the row of magnets closest to bracket 34. It will be appreciated however, that the "zero" end of the row of magnets could start from either and of housing 70. The purpose of the fractions shown in the columns headed "A", "B", and sequence, and designating electromagnets, as per the showing in FIG. 4, is to designate increments of power which will cause only proportional movement of element 26. Zero power application will result in no magnetic force being extended between the electromagnets 72, 72' and the ridges of armature 18, while a unit increment will result in full maximum power being exerted. The unit increment can equal a fully energized coil at, for example, 3.5 amps and 45 volts. The chart of FIG. 5 also assumes a 0.050 inch ridge spacing with the surface of member 26 being divided into 50 increments. The result of power being incrementally applied in phases, as indicated, is a "vernier effect" wherein different power is effectively applied to member 26 by each magnet of the device.

FIG. 6 illustrates diagrammatically the manner in which the electromagnets A–E are energized to accomplish one move sequence of 0.010 inch. In this representation the upwardly facing teeth 1–5 each represent equally spaced collections of corresponding ridge bars on the upper surface of armature element 26. Similarly, the downwardly facing teeth A–E represent the incrementally offset pole faces of the electromagnets A–E. It will be understood that each facing surface is actually comprised of a plurality of spaced apart ridge bar faces with each set A–E progressively offset toward the right as defined in FIG. 6. Those electromagnets to which full or unit power is applied are designated by a circle around the capital letter indicating the phased power applied to the respective electromagnets A–E as set forth in FIG. 5. Lines have been drawn between the pole faces of the representative electromagnets faces and the corresponding portions of member 26 to partially the indicate power applied thereto. As can be seen at the start of the A, B, C phase, the electromagnets A, B and C are fully energized. This causes a shift of armature 26 rightwardly by 0.001 inches, i.e., unit 1 B is aligned with a covered set of ridge bars "2", and A and C are positioned relative to the sets of ridge bars "1" and "3", respectively, such that they impose equal and opposite forces thereupon. The next four increments involve progressively decreasing the current to phase A by 1/5 per step until the current applied to A goes to zero and only B and C are fully energized. Subsequently, electromagnet D is progressively energized until it reached unit power to form the B, C, D phase shown at the bottom of FIG. 6 and presenting a distance shift of 0.010 inch. This sequence is then repeated to accomplish a full 0.050 inch relative shift which corresponds to the opening between the ridge bars of the armature. Further repetition of the sequence will continue motion of the armature to a desired portion. Similarly, a reversal of the sequence will cause motion in the opposite direction.

DESCRIPTION OF FIG. 7

Figure 7:
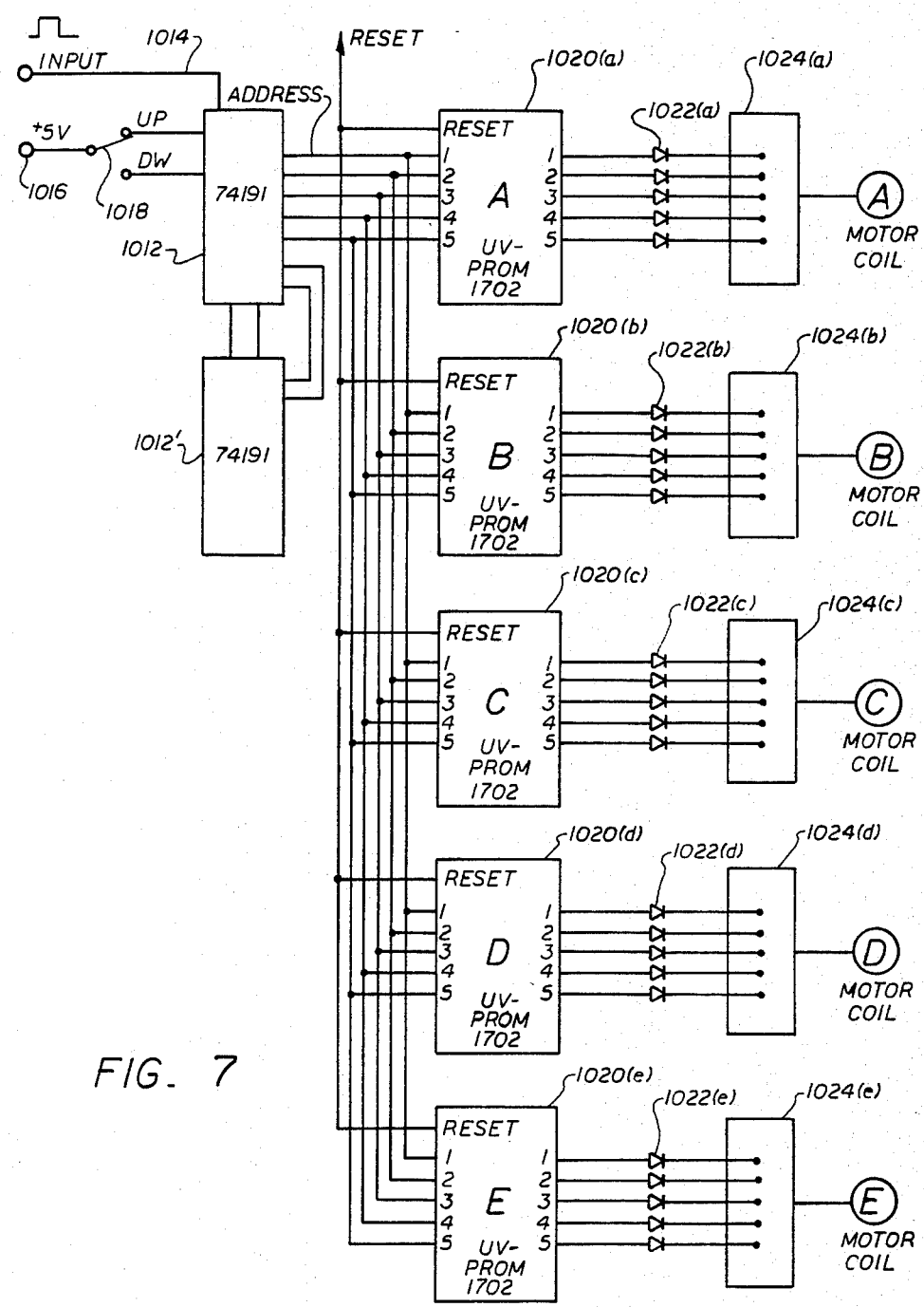
FIG. 7 is a schematic diagram of a motor control circuit for use with the present invention.

Referring now to FIG. 7, a control circuit 1010 suitable for driving motor 22 is schematically illustrated and preferably comprises a pair of up-down counters 1012, 1012' connected to an input signal line 1014 feeding pulses from a conventional oscillator (not shown) and to a source of power 1016 in order to selectively count up or down by placement of a conventional single pole, double throw switch 1018 as it is desired to move element 26 in one direction or the other. Counters 1012, 1012', which may be 74191's, are cascaded in order to carry from one to the other and provide for counting up to, for example, 50. The outputs of counter 1012 are applied to the inputs of five programable read-only memorys (EPROMs) 1020 which have been programmed by known techniques to sequence power to each coils A through E in accordance with the program illustrated in FIGS. 5 and 6. The output from each EPROM 1020 is fed in five phases, per the illustrated example, to an associated drive transistor 1022 and into an amplifier 1024 associated with a respective coil A through E. Each amplifier 1024 is constructed in a conventional manner, as from power transisters (not shown), in order to provide the associated coil with increments of power, of five levels in accordance with FIGS. 5 and 6, for example.

Counters 1012, 1012' are arranged to count, up or down, between 0–50 and repeat, so as to provide 50 different addresses in the illustrated example. The EPROMs 1020, which can be, i.e., armature positions, "INTEL" 1702s, preferably are programmable in a conventional manner to sequence coils A through E as desired.

DESCRIPTION OF FIG. 8

Referring now more particularly to FIG. 8 of the drawings, disk pack portion 12 of drive unit 10 will now be described.

Disk pack portion 12 includes a plurality of disks 80 rotatably mounted on a suspension means 82 which includes an axle 83 in the form of a fixed cylindrical shaft 84 extending between a pair of supporting pillow blocks 85, 85', or the like. Extending through shaft 84 is one or more fluid passageways 92 and radially extending branches 94. Associated with one end of shaft 84, adjacent bearing 85' as illustrated, is a drive arrangement in the form of an electric motor 86 which rotates disks 80 in a predetermined direction. The suspension arrangement 82 includes three fluid thrust bearings 88 (only two being shown) arranged symmetrically about the axis of shaft 84 for limiting axial shifting movement of the motor armature 90 and disk supporting hub 91 relative to shaft 84 as might result from the starting torque of motor 86. The latter is an electric motor of conventional construction having a stator 89 and an internal armature 90 rotatable on shaft 84. Since motor 86 is of generally conventional construction, it will not be described in greater detail herein.

Suspension arrangement 82 further includes a hub 91 of symmetrical configuration having oppositely facing walls curving away from a mid or belt portion of maximum diameter and toward the ends of shaft 84. Extending substantially co-axially through the interior of shaft 84 is a conduit 92 connectable to a soruce of fluid under pressure, such as that designated 64 in FIG. 1, and having a plurality of branches 94 extending to and surrounding perforations 96 formed in the cylindrical surface of shaft 84. The inner portion of hub 91 is formed by a bearing liner 97 constructed from a material impervious to gas and accordingly rides on a fluid cushion formed between the outer surface of shaft 84 and liner 97 by injection of air or a similar gas from branches 94 and perforations 96 to the space between shaft 84 and liner 97.

Disposed outside the plurality of annular disks 80 are a pair of annular cover plates 98 and 98', with the entire assembly being held together by a pair of annular clamps 100 and 100' biased toward one another by a plurality of screw threaded studs 102 retained in place by the illustrated nuts 104. Arranged between the disks 80 are spacers 106. Spacers 108 of a lesser width are placed between the outermost disks 80 and the cover plates 98 and 98' so as to maintain proper spacing between the disks 80 and cover plates 98, 98' under the bias of clamps 100, 100'. The central spacer, designated 110, is an extension of hub 91 and connects the several disks 80 to hub 91 for rotation thereby. Spacers 106 and 108 have extensions thereof which engage with the studs 102 in order to prevent rotation of the disks 80 and cover plates 98, 98' relative to clamps 100 and 100'.

The aforementioned axial fluid thrust bearings 88 are affixed to the device base and maintain the entire rotating assembly in axial position relative to shaft 84 without requiring actual bearing surface constant. They also maintain armature 90 in alignment relative to stator 89. A planar disk member 112 is attached to the armature 90 of motor 86 for rotation thereby and is also affixed by suitable fasteners (not shown) to hub 91 for rotating the hub 91 and disks 80. Pressurized air or other lubricating fluid is input to each thrust bearing 88 through a pair of fluid lines 114 and 116. The pressurized air is ducted through internal passageways 117 and 118 respectively, to opposing bearing faces 119 and 120 of an annular bearing slot which receives disk member 112. Fluid from the lines 114 and 116 is thus caused to impinge on member 112 in balancing relation. Attachment of member 112 to motor 86 is illustrated as being by a sleeve 122 rotatable on shaft 84 and affixed to armature 90 and having, for example, three lugs (only two being shown) 122 through each of which extends a pin 124 which also extends through member 112. A conventional coiled compression spring 126, or the like, is provided on pin 124 between sleeve 122 and member 112 in order to bias member 112 and motor armature 90 away from one another. By this arrangement, the fluid impinging on opposed faces of member 112 will cushioningly limit the extent of longitudinal shifting due to axial movements of armature 90, such as might be generated by the starting torque of motor 86, and serves to isolate the recording disk array in hub 91 from such axial motion.

As can be appreciated from the above description and from the drawings, a magnetic disk drive assembly according to the present invention permits highly responsive and accurate positioning of a read/write magnetic head relative to an associated disk pack, or stack, due to the use of a linear motor which is easily assembled yet is highly precise and quick to respond, and also due to the use of fluid bearings throughout.

Whereas, the preferred embodiment of the present invention has been described above, it is contemplated that other alterations and modifications may become apparent to those skilled in the art after having read the above disclosure. It is therefore intended that the appended claims be interpreted as covering all such alterations and modifications as fall withing the true spirit and scope of the invention.

What is claimed is:

1. Head positioning apparatus for magnetic recorders and the like comprising:

an elongated electromagnetic stator assembly having an armature member receiving slot extending therealong;

an armature assembly arranged for movement relative to said stator assembly to carry a head assembly connected thereto relative to an associated recording medium, said armature assembly including an elongated electromagnetically driveable armature member disposed within said slot and having a first end extending beyond one end of said stator assembly and a second end extending beyond the opposite end of said stator assembly; and carriage means for supporting said armature member and allowing it to be driven along its longitudinal axis relative to said stator assembly, said carriage assembly including a pair of guide block means respectively disposed on opposite sides of said stator assembly, each said block means having a slideway formed therein and extending therethrough in a direction parallel to said longitudinal axis, a pair of elongated bearing shafts disposed to extend through respective ones of said slideways, and end bracket means coupling the corresponding ends of said shafts to each other and to the corresponding ends of said armature member, said end bracket means being rigidly attached to one of said shafts and pivotally attached to the other whereby said shafts remain free to self align themselves relative to said slideways as they transport said armature member from one end of its travel extent to the other.

2. Head positioning apparatus as recited in claim 1 wherein fluid passageways are provided in said block means to communicate pressurized fluid from a source into the clearances between said slideways and said shafts to provide lubrication therebetween.

3. Head positioning apparatus as recited in claim 2 wherein said elongated armature member has a plurality of first magnetic flux conducting elements extending transversely thereacross with such elements being disposed at equal intervals along the length thereof, and wherein said stator assembly includes a plurality of electromagnet means having oppositely polarizable first and second pole faces disposed in facing relationship to said armature member, said pole faces each having second magnetic flux conducting elements extending parallel to said first flux conducting elements such that magnetic flux from a first pole face will be coupled through said first flux conducting elements to an associated second pole face.

4. Head positioning apparatus as recited in claim 3 wherein said electromagnet means are serially aligned along said receiving slot and are spaced relative to each other so that the said second magnetic flux conducting elements of each said electromagnetic means are progressively incremented in the direction of the longitudinal axis of said armature member, such that selective energization of said electromagnet means will cause said armature member to be incrementally advanced along its longitudinal axis.

5. Head positioning apparatus as recited in claim 4 wherein each said end bracket means includes a first arm rigidly affixed to one of said shafts and said armature member, and a second arm rigidly affixed to the other of said shafts, the distal extremities of said first and second arms being pivotally attached to each other such that one of said shafts is free to move laterally relative to the other of said shafts.

6. Head positioning apparatus as recited in claim 5 wherein said first arm extends from the shaft to which it is attached and beyond the corresponding end of said armature member to a point vertically above the other shaft, and wherein said second arm extends upwardly from said other shaft where it engages and is pivotally affixed to said first arm.

7. Head positioning apparatus as recited in claim 6 and further comprising electronic signal generating means for sequentially and selectively energizing various ones of said electromagnet means so as to cause said armature means to be incremently moved from any first position to any second position.

8. Head positioning apparatus as recited in claim 7 wherein said electromagnet means are disposed in series along said slot both above and below said armature member.

* * * * *